(12) United States Patent
Carvell et al.

(10) Patent No.: US 12,556,118 B2
(45) Date of Patent: Feb. 17, 2026

(54) METHOD AND APPARATUS FOR MAINTAINING THE ROTOR D FLUX FOR PULSING INDUCTION MACHINES AND ELECTRICALLY EXCITED SYNCHRONOUS ELECTRIC MACHINES

(71) Applicant: Tula eTechnology, Inc., San Jose, CA (US)

(72) Inventors: Paul Carvell, San Jose, CA (US); Benjamin M. Wolk, Oakland, CA (US); Matthew A. Younkins, Los Gatos, CA (US)

(73) Assignee: Tula eTechnology, Inc., San Jose, CA (US)

( * ) Notice: Subject to any disclaimer, the term of this patent is extended or adjusted under 35 U.S.C. 154(b) by 178 days.

(21) Appl. No.: 18/589,010

(22) Filed: Feb. 27, 2024

(65) Prior Publication Data

US 2024/0291410 A1 Aug. 29, 2024

Related U.S. Application Data

(60) Provisional application No. 63/448,982, filed on Feb. 28, 2023.

(51) Int. Cl.
*H02P 21/30* (2016.01)
*H02P 21/18* (2016.01)
*H02P 27/06* (2006.01)

(52) U.S. Cl.
CPC ............. *H02P 21/30* (2016.02); *H02P 21/18* (2016.02); *H02P 27/06* (2013.01); *H02P 2207/05* (2013.01)

(58) Field of Classification Search
CPC .......... H02P 21/30; H02P 21/18; H02P 27/06; H02P 2207/05
See application file for complete search history.

(56) References Cited

U.S. PATENT DOCUMENTS

| 7,541,768 B2 | 6/2009 | Kim et al. |
| 8,773,063 B2 | 7/2014 | Nakata |

(Continued)

FOREIGN PATENT DOCUMENTS

| CN | 113098357 | 7/2021 |
| FR | 2989479 | 10/2013 |

(Continued)

OTHER PUBLICATIONS

Carvell et al., U.S. Appl. No. 18/362,602, filed Jul. 31, 2023.

(Continued)

*Primary Examiner* — Zoheb S Imtiaz
(74) *Attorney, Agent, or Firm* — Beyer Law Group LLP

(57) ABSTRACT

An electric machine is provided. A polyphase machine comprising at least one of an induction machine and an externally excited synchronous machine is provided. A power inverter is electrically connected to the polyphase machine. An inverter controller is electrically connected to the power inverter, wherein the inverter controller is configured to provide a torque command, wherein the torque command provides a torque signal to provide a plurality of pulses that pulse between a first demand torque level and a second demand torque level, wherein the second demand torque level is lower in amplitude than an amplitude of the first demand torque level and control an $i_d$ provided by the power inverter, so that when the torque signal is at the first demand torque level, rotor flux strictly increases and when the torque signal is at the second demand torque level, rotor flux strictly decreases.

10 Claims, 5 Drawing Sheets

(56) References Cited

U.S. PATENT DOCUMENTS

| | | |
|---|---|---|
| 10,742,155 B2 | 8/2020 | Tripathi |
| 10,944,352 B2 | 3/2021 | Mazda et al. |
| 11,077,759 B1 | 8/2021 | Srinivasan |
| 11,088,644 B1 | 8/2021 | Carvell |
| 11,133,763 B1 | 9/2021 | Islam |
| 11,133,767 B2 | 9/2021 | Serrano et al. |
| 11,167,648 B1 | 11/2021 | Carvell et al. |
| 11,228,272 B2 | 1/2022 | Tripathi |
| 11,427,177 B2 | 8/2022 | Serrano et al. |
| 11,623,529 B2 | 4/2023 | Carvell et al. |
| 11,626,827 B2 | 4/2023 | Tripathi |
| 11,628,730 B2 | 4/2023 | Srinivasan |
| 11,695,361 B2 | 7/2023 | Carvell et al. |
| 11,863,096 B2 | 1/2024 | Carvell |
| 12,003,202 B2 | 6/2024 | Tripathi |
| 2016/0254771 A1* | 9/2016 | Qiao ...................... H02P 21/20 318/400.02 |
| 2019/0267919 A1 | 8/2019 | Suzuki et al. |
| 2020/0039362 A1 | 2/2020 | Ronning et al. |
| 2022/0234451 A1 | 7/2022 | Srinivasan |
| 2022/0416707 A1 | 12/2022 | Chen |
| 2023/0114289 A1 | 4/2023 | Islam et al. |
| 2023/0219426 A1 | 7/2023 | Carvell et al. |
| 2023/0223885 A1 | 7/2023 | Tripathi |
| 2023/0253911 A1 | 8/2023 | Islam |
| 2023/0308040 A1 | 9/2023 | Farah et al. |
| 2023/0412097 A1* | 12/2023 | Arafat ...................... H02P 23/12 |
| 2024/0022191 A1 | 1/2024 | Phillips et al. |
| 2024/0022199 A1 | 1/2024 | Phillips et al. |
| 2024/0022200 A1 | 1/2024 | Phillips et al. |
| 2024/0063735 A1 | 2/2024 | Islam et al. |
| 2024/0063744 A1 | 2/2024 | Islam et al. |
| 2024/0063745 A1 | 2/2024 | Parsels et al. |
| 2024/0136968 A1 | 4/2024 | Mazda |

FOREIGN PATENT DOCUMENTS

| | | |
|---|---|---|
| JP | H05153705 | 6/1993 |
| JP | 10243680 | 9/1998 |
| JP | 2002-359994 | 12/2002 |
| JP | 2011-67043 | 3/2011 |
| JP | 2012-228134 | 11/2012 |
| JP | 5165660 B2 | 12/2012 |
| JP | 5857472 B2 | 12/2015 |
| JP | 2020048254 A | 3/2020 |
| JP | 2017-200284 | 11/2021 |
| KR | 10-2007-0048065 | 5/2007 |

OTHER PUBLICATIONS

International Search Report and Written Opinion dated Jun. 25, 2024 from International Application No. PCT/US2024/017439.

Carvell, U.S. Appl. No. 18/630,634, filed Apr. 9, 2024.

* cited by examiner (A) Q-axis Circuit (B) D-axis Circuit

Table 1

| Strategy | Id Lower Limit | Id Upper Limit | Current Controller Gain | Total Loss (W) | Total Loss vs Baseline (%) | Copper Loss (W) | Core Loss (W) | Inverter Loss (W) | Mechanical Loss (W) |
|---|---|---|---|---|---|---|---|---|---|
| Non-Pulsed | $-I_s$ Max | $I_s$ Max | Standard | 1866 | N/A | 66 | 410 | 902 | 488 |
| 1 | $-I_s$ Max | $I_s$ Max | Standard | 9365 | +402% | 5388 | 511 | 2978 | 488 |
| 2 | 0 | $I_s$ Max | Standard | 1771 | -5% | 171 | 530 | 582 | 488 |
| 3 | 0 | $I_d$ Max | Optimized | 1745 | -7% | 157 | 533 | 567 | 488 |

FIG. 6

METHOD AND APPARATUS FOR MAINTAINING THE ROTOR D FLUX FOR PULSING INDUCTION MACHINES AND ELECTRICALLY EXCITED SYNCHRONOUS ELECTRIC MACHINES

CROSS-REFERENCE TO RELATED APPLICATION

This application claims the benefit of priority of U.S. Application No. 63/448,982, filed Feb. 28, 2023, which is incorporated herein by reference for all purposes.

BACKGROUND

The background description provided here is for the purpose of generally presenting the context of the disclosure. The information described in this background section, as well as aspects of the description that may not otherwise qualify as prior art at the time of filing, are neither expressly nor impliedly admitted as prior art against the present disclosure.

The present application relates generally to electric machine control. More specifically, control schemes and controller designs are described that smoothly pulse the operation of an electric machine during selected operating conditions to facilitate operating the electric machine in a more energy efficient manner.

The term "electric machine" as used herein is intended to be broadly construed to mean both electric motors and generators. Electric motors and generators are structurally very similar. Both include a stator having a number of poles and a rotor. When an electric machine is operating as a motor, it converts electrical energy into mechanical energy. When operating as a generator, the electric machine converts mechanical energy into electrical energy.

Electric motors and generators are used in a very wide variety of applications and under a wide variety of operating conditions. In general, many modern electric machines have relatively high energy conversion efficiencies. The energy conversion efficiency of most electric machines, however, can vary considerably based on their operational load. With many applications, an electric machine is required to operate under a wide variety of different operating load conditions. As a result, many electric machines operate at or near the highest levels of efficiency at certain times, while at other times, they operate at lower efficiency levels.

Battery powered electric vehicles provide a good example of an electric machine operating at a wide range of efficiency levels. During a typical drive cycle, an electrical vehicle will accelerate, cruise, de-accelerate, brake, corner, etc. Within certain rotor speed and/or torque ranges, the electric machine operates at or near its most efficient operating point, i.e., its "sweet spot". Outside these ranges, the operation of an electric machine is less efficient. As driving conditions change, the electric machine transitions between high and low operating efficiency levels as the rotor speed and/or torque demand change. If the electric machine could be made to operate a greater proportion of a drive cycle in high efficiency operating regions, the range of the vehicle for a given battery charge level would be increased. Since the limited range of battery powered electric vehicles is a major commercial impediment to their use, extending the operating range of the vehicle is highly advantageous.

Although the energy conversion efficiency of conventional electric machines is generally good, there are continuing efforts to further improve energy conversion efficiencies over broader ranges of operating conditions.

SUMMARY

To achieve the foregoing and in accordance with the purpose of the present disclosure, an electric machine is provided. A polyphase machine comprising at least one of an induction machine and an externally excited synchronous machine is provided. A power inverter is electrically connected to the polyphase machine. An inverter controller is electrically connected to the power inverter, wherein the inverter controller is configured to provide a torque command, wherein the torque command provides a torque signal to provide a plurality of pulses that pulse between a first demand torque level and a second demand torque level, wherein the second demand torque level is lower in amplitude than an amplitude of the first demand torque level and control an $i_d$ provided by the power inverter, so that when the torque signal is at the first demand torque level, rotor flux strictly increases and when the torque signal is at the second demand torque level, rotor flux strictly decreases.

In another manifestation, a method for pulsing a polyphase machine comprising at least one of an induction machine electrically and an externally excited synchronous machine connected to a power inverter and an inverter controller controllably connected to the power inverter is provided. A torque command is provided, wherein the torque command provides a torque signal to provide a plurality of pulses that pulse between a first demand torque level and a second demand torque level, wherein the second demand torque level is lower than the first demand torque level. An $i_d$ provided by the power inverter is controlled, so that when the torque signal is at the first demand torque level, rotor flux strictly increases, and when the torque signal is at the second demand torque level, rotor flux strictly decreases.

These and other features of the present disclosure will be described in more detail below in the detailed description and in conjunction with the following figures.

BRIEF DESCRIPTION OF THE DRAWINGS

The invention and the advantages thereof may best be understood by reference to the following description taken in conjunction with the accompanying drawings in which:

FIG. 6 is a table that shows the amount of loss provided by different processes.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Figure 1A:
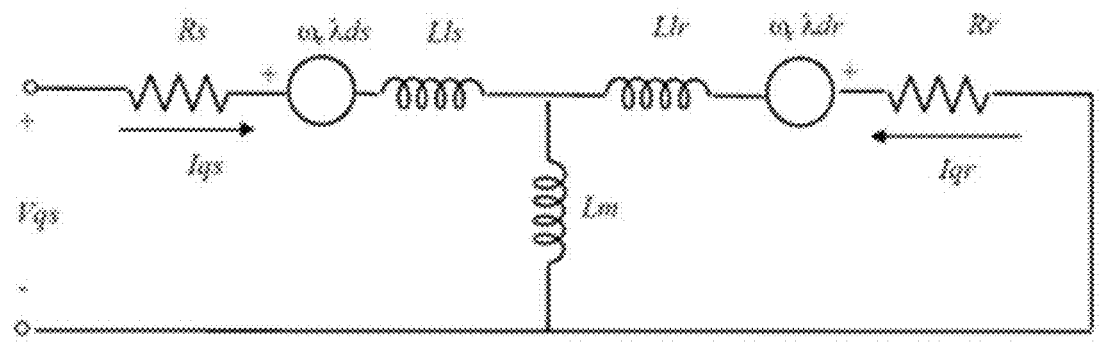
FIGS. 1A-B is a schematic illustration of an induction motor electrical model after transformation into the dq frame.

Modern electric machines have relatively high energy conversion efficiencies. The energy conversion efficiency of most electric machines, however, can vary considerably based on their operational load. With many applications, a machine is required to operate under a wide variety of different operating load conditions. In addition, the torque provided by an electric machine may vary over operation requiring a variation from a first torque to a second torque. The first torque may be a first torque level and the second torque may be a second torque level.

Most electric machines (motors and generators) are controlled to deliver the highest efficiency under steady state conditions with no consideration for transient periods. Also, for high bandwidth torque controllers, minimum possible transient periods are desired which mostly leads to suboptimal control due to controller output saturation.

One of the most widely used alternating current (AC) motors is a three-phase AC induction machine (IM). In an induction machine, a rotation field in a stator induces current to flow in a rotor winding which in turn induces a rotor magnetic field. The interaction of the rotor and stator magnetic fields generates an electromagnetic force (EMF) causing rotation of the rotor, which in turn rotates a motor shaft. The rotating shaft provides the output torque of the motor.

Another type of AC machine is an externally excited synchronous machine (EESM), also known as a wound field machine. EESM are a type of machine that excites the flux field on the rotor with an independent circuit rather than using permanent magnets. This type of machine has proved to be more efficient at high-speed operation because the magnetic field can be optimally controlled. In a three-phase EESM, the stator may include a three-coil winding that is excited by a three-phase AC input, providing AC excitation, and the field windings are on the rotor that are powered by a DC input. When the three-phase AC input is passed through the three-phase armature (stator) windings, a rotating magnetic field (RMF) is generated. The rotational rate of the RMF is known as the synchronous speed of the electric machine. The interaction of the field (rotor) winding fields and armature winding fields generates an electromagnetic force (EMF) causing the rotor rotation.

Some embodiments may be used in pulsed electric machine control. Pulsed control is described in U.S. patent application Ser. No. 16/353,159 filed on Mar. 14, 2019, and U.S. Provisional Patent Application Nos.: 62/644,912, filed on Mar. 19, 2018; 62/658,739, filed on Apr. 17, 2018; and 62/810,861 filed on Feb. 26, 2019. Each of the foregoing applications is incorporated herein by reference in their entirety. In some embodiments, an inverter controller provides a pulsed torque at a frequency of at least 1 Hz for the purpose of increasing machine efficiency. It has been found that high frequency pulsing of induction machines and EESM machines may reduce the machine efficiency.

To better understand this invention, the basic principle of how high frequency pulsing is applied to an induction motor is analyzed.

Figure 1B:
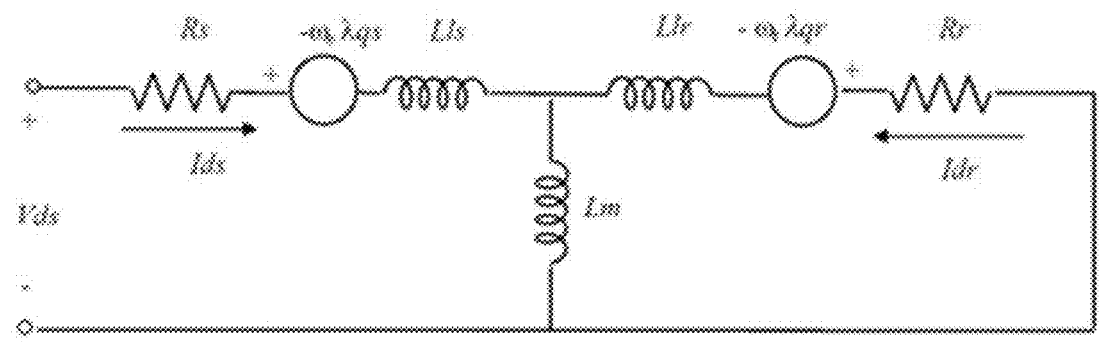

FIGS. 1A-B represent the induction motor electrical model after transformation into the dq frame, where FIG. 1A illustrates the Q-axis circuit and FIG. 1B illustrates the D-axis circuit. Compared to a multi-phase analysis, this DQ frame analysis is simpler to derive the mathematical model and understand the shaft torque produced during a transient response.

The DQ (Direct Quadrature) frame of reference is a concept commonly used in the field of electrical engineering, particularly in the analysis and control of three-phase AC electrical systems. It is a mathematical transformation technique used to simplify the analysis of such systems, particularly in the context of AC machines like induction motors and synchronous generators.

In the DQ frame, the three-phase quantities (voltages, currents, etc.) are transformed from the original ABC (or phase) frame to a new reference frame defined by two axes: the D-axis (Direct axis) and the Q-axis (Quadrature axis). These axes are oriented such that the D-axis aligns with the magnetic flux and the Q-axis is perpendicular to the D-axis.

The transformation from ABC to DQ is achieved using mathematical transformations such as the Park transformation or Clarke transformation. Once transformed, analysis and control of the electrical system become simpler, especially in the context of variable-speed drives, where it is often necessary to control the torque and flux of the machine.

The DQ frame simplifies the control algorithms, making it easier to design controllers for various applications such as motor control, renewable energy systems, and power electronics.

$[V^e]=[Z^e][i^e]$ represents the situation in the stationary rotating reference frame with all values transformed to the stator, where $V^e$ is the Voltage, $Z^e$ the Impedance, and $i^e$ the current applied.

The three variables are all vectors, where:

$$[V^e] = \left[V_{qs}^e V_{ds}^e V_{qr}^e V_{dr}^e\right]^T$$

and $$[i^e] = \left[i_{qs}^e i_{ds}^e i_{qr}^e i_{dr}^e\right]^T$$

And $$[Z^e] = \begin{bmatrix} R_s + L_s p & \omega_s L_s & L_m p & \omega_s L_m \\ -\omega_s L_s & R_s + L_s p & -\omega_s L_m & L_m p \\ L_m p & (\omega_s - \omega_r)L_m & R_r + L_r p & (\omega_s - \omega_r)L_r \\ -(\omega_s - \omega_r)L_m & L_m p & -(\omega_s - \omega_r)L_r & R_r + L_r p \end{bmatrix}$$

Where the constituent variables are defined as $i_{ds}^e$ – direct stator current $i_{qr}^e$ – quadrature stator current $i_{dr}^e$ – direct rotor current $i_{qs}^e$ – quadrature rotor current $L_m$—Mutual Inductance
$L_r$—Rotor Inductance=rotor leakage inductance plus mutual inductance $$L_r = L_m + L_{lr}$$

$L_s$—Stator Inductance=stator leakage inductance plus mutual inductance $$L_s = L_m + L_{ls}$$

P—Number of motor poles $$p - \frac{d}{dx}$$

Derivative (of current)
$R_r$—rotor resistance
$R_s$—stator resistance $V_{dr}^e$ – direct rotor voltage = 0 for an induction motor (shorted secondary)

$V_{qr}^e$ – quadrature rotor voltage = 0 for an induction motor (shorted secondary)

$V_{ds}^e$ – direct stator voltage $V_{qs}^e$ – quadrature stator voltage $\omega_s$—Stator frequency
$\omega_r$—rotor frequency $$\text{Electromagnetic Torque} = \frac{3}{2}\frac{P}{2}L_m(i_{qs}^e i_{dr}^e - i_{ds}^e i_{qr}^e)$$

This is normally reduced to its steady state analysis, ignoring the dynamic or transient values, by approximating derivatives as equal to 0. This is an acceptable simplification if the rate of change of the voltage or current is limited to less than the electrical time constant of the circuit. The induction motor's main time constant is $L_r^e/R_r^e$ which limits the rate at which the rotor magnetic flux builds up. In practice, for common designs, that ratio can often be around 100 ms, which can be quite limiting in terms of the ability to arbitrarily change torque rapidly.

For transient conditions we set $\omega_s=0$.

$$\text{So } [Z^e] \text{ becomes } [Z_t^e] = \begin{bmatrix} R_s + L_s p & 0 & L_m p & 0 \\ 0 & R_s + L_s p & 0 & L_m p \\ L_m p & -\omega_r L_m & R_r + L_r p & -\omega_r L_r \\ \omega_r L_m & L_m p & \omega_r L_r & R_r + L_r p \end{bmatrix}$$

Where $[V^e]=[V_{qs}^e \; V_{ds}^e \; 0 \; 0]^T$ as the induced rotor current is zero at zero speed then $V_{dr}^e=V_{qr}^e=0$. This is also true of the induction motor at any speed when the torque is zero hence the slip speed, $(\omega_s-\omega_r)$, is zero.

$$\text{Let } [R] = \begin{bmatrix} R_s & 0 & 0 & 0 \\ 0 & R_s & 0 & 0 \\ 0 & 0 & R_r & 0 \\ 0 & 0 & 0 & R_r \end{bmatrix} \text{ and}$$

$$[L] = \begin{bmatrix} L_s & 0 & L_m & 0 \\ 0 & L_s & 0 & L_m \\ L_m & 0 & L_r & 0 \\ 0 & L_m & 0 & L_r \end{bmatrix} \text{ and } [G] = \begin{bmatrix} 0 & 0 & 0 & 0 \\ 0 & 0 & 0 & 0 \\ 0 & -L_m & 0 & -L_r \\ L_m & 0 & L_r & 0 \end{bmatrix}$$

$$[V] = [L]p[i] + [G][i] + [R][i]$$

Note that as $V_{dr}^e=V_{qr}^e=0$ the bottom 2 rows of [R], [L] and [G] can be eliminated hence the term [G][i]=0. From this, we get the standard inductive charge current as a function of voltage. Now as these variables are in the stationary rotating reference frame we know that $V_{qs}^e$ and $V_{ds}^e$ are a function of the rotor angle $V_{ds}^e=-V_m \sin \lambda$ and $V_{ds}^e=V_m \cos \lambda$, where $V_m$ is the amplitude of the applied voltage. We end up with $$V_m \cos\lambda = L_s\frac{di_{qs}^e}{dt} + L_m\frac{di_{qr}^e}{dt} + R_s i_{qs}^e - V_m\sin\lambda = L_m\frac{di_{ds}^e}{dt} + L_{mr}\frac{di_{dr}^e}{dt} + R_s i_{ds}^e.$$

From the above, we can see at time zero the stator current is zero and will rise exponentially limited by the applied voltage, angle, and the stator resistance $i_{qs}^e=V_m \cos \lambda/R_s$ and $i_{ds}^e=-V_m \sin \lambda/R_s$ and that the rate of rise of that current will be the time constants associated with the electric machine's inductive matrix. These inductances are subject to the magnetic saturation of the core material of the electric machine and hence are non-linear in nature.

In order to produce torque, the rotor field needs to be energized. This rotor field magnetizing flux of $\varphi_r^e=L_m i_{ds}^e$ $i_{qs}^e$ and $i_{ds}^e$ currents alone will not produce a torque.

So if we rewrite the torque equation in terms of the rotor flux we get $$Tem = \frac{3}{2}\frac{P}{2}\frac{L_m}{L_r}\lambda_{dr}^e i_{qs}^e$$

$$\lambda_{dr}^e = L_m \cdot \frac{i_{ds}^e}{(\tau_r s + 1)}$$

Therefore, $$Tem = \frac{3}{2}\frac{P}{2}\frac{L_m}{L_r}i_{qs}^e \cdot L_m \frac{i_{ds}^e}{(\tau_r s + 1)} = K \cdot i_{qs}^e \cdot i_{ds}^e \cdot \frac{1}{(\tau_r s + 1)}$$

where $$L_r = L_m + L_2 \text{ and } \tau_r = \frac{(L_m + L_2)}{R_r} \text{ and } K = \frac{3}{2}\frac{P}{2}\frac{L_m^2}{(L_m + L_2)}$$

This shows us that the rotor time constant is effectively a filter dominating the rate at which the torque can be established. For a maximum rate of change of torque, we need to remove this time delay so that it only becomes a function of the stator time constants. This can be achieved ideally by setting $\lambda_{dr}^e$ constant hence $i_{ds}^e$ is held constant at a level that can support the demanded torque. This is inefficient so the normal control strategy for an induction motor is to apply a rate of change of torque that is less than the rotor time constant so that it dominates the rate of change of torque hence the induction motor can follow a Maximum Torque Per Amp (MTPA) trajectory providing the highest efficiency of operation.

An alternative strategy that improves the rate of change of torque but sacrifices efficiency is to allow d-flux dominant control. In this method, iq is sacrificed, and instead the magnetizing current id and in turn $\lambda_{dr}^e$ are preferentially increased. This strategy is limited by, among other things, the available voltage beyond the existing back electromotive force (BEMF); and as such this strategy is more appropriate at lower motor speeds.

We know that Lm is a function of id due to the saturation of the magnetic circuit and therefore K and $\tau_r$ are also functions of id.

For induction motors, the rate of change of Idq<<rate of change of $\lambda_{dr}^e$. This allows the approximation:

$$\lambda_{dr}^e = L_m \cdot \frac{i_{ds}^e}{(\tau_r s + 1)}$$

If id is a constant value that equates to the value required for the D flux to produce the demanded torque, then we can say that this is an exponential waveform and from knowledge that an exponential waveform reaches 95% of its final value that the time to 95% of the demanded torque point will be 3 times the rotor time constant 3*$\tau_r$. This gives us the worst-case torque transient timing. However, the non-linear inductance which saturates as id increases still needs to be accounted for. This reduces the value of $L_m$ and hence the time constant. This indicates the worst case time to the demanded torque is <3*$\tau_r$.

To increase the torque ramp rate, $i_d$ should reach the maximum allowable, reducing as the D flux reaches a target. In practice, it may be necessary to limit the $i_d$ current supporting the buildup of the D flux to allow for some $i_q$ current to produce torque as well as to limit the copper losses associated with building up D flux (D flux scales linearly with $i_d$ whereas copper losses scale quadratically). This limit has been identified as the key to tuning for the minimum torque transition time when the associated losses are taken into consideration.

The optimization of the fastest transition time and the losses associated with that transition involve non-linear equations and integral loops. One strategy to determine the optimal parameters is to model the system computationally and run optimizations on those models. Appropriate assumptions were made to simplify the model and concentrate on the torque transition. These were chiefly that the time constants of the stator were at least an order of magnitude less than the flux time constant. This allows an approximation that the measured current in a control system is the same as that demanded. This approximation reduces the necessity of including the modeling of the plant and current loops. A Simulink block diagram of a control system model may be used to model the delay using filters with the times constants associated with the stator.

The ability to turn the inverter off is important for achieving efficiency improvements under pulsed torque control, especially with induction machines. Let us consider what happens to an induction machine rotor current when the inverter is turned off. As before we will start with the basic equation and then make some valid assumptions to simplify the equations.

$$[V^e] = [Z^e][i^e] \quad [V^e] = [V_{qs}^e V_{ds}^e V_{qr}^e V_{dr}^e]^T \text{ and } [i^e] = [i_{qs}^e i_{ds}^e i_{qr}^e i_{dr}^e]^T$$

$$[Z^e] = \begin{bmatrix} R_s + L_s p & \omega_s L_s & L_m p & \omega_s L_m \\ -\omega_s L_s & R_s + L_s p & -\omega_s L_m & L_m p \\ L_m p & (\omega_s - \omega_r) L_m & R_r + L_r p & (\omega_s - \omega_r) L_r \\ -(\omega_s - \omega_r) L_m & L_m p & -(\omega_s - \omega_r) L_r & R_r + L_r p \end{bmatrix}$$

Assumptions when the stator inverter is turned off
Ids=iqs=0 (no stator current)
IM so Vdr=Vqr=0 (shorted rotor)
EM torque=0 so ws=wr (no slip)

Reduce matrix accordingly $$[Z^e] = \begin{bmatrix} 0 & 0 & L_m p & \omega_s L_m \\ 0 & 0 & -\omega_s L_m & L_m p \\ 0 & 0 & R_r + L_r p & 0 \\ 0 & 0 & 0 & R_r + L_r p \end{bmatrix}$$

We get $Vqs = idr \cdot Lm \cdot p + iqr \cdot ws \cdot Lm$ $Vds = -idr \cdot ws \cdot Lm + iqr \cdot Lm \cdot p$ $0 = idr \cdot Rr + idr \cdot Lr \cdot p$ $0 = iqr \cdot Rr + iqr \cdot Lr \cdot p$ $Idr = -(idr/dt) \cdot Lr/Rr$ and $Iqr = -(iqr/dt) \cdot Lr/Rr$ Under field oriented control iqr=0 which will be true just before the stator inverter is turned off. If we also assume the D and Q axes are decoupled magnetically, which is not true but reasonable as the Lmqd are relatively small, then we can say that for an IM the rotor flux will inherently decay slowly with the time constant Lr/Rr. We can also say that the BEMF measured at the stator will also decay slowly since:

$Vqs = idr \cdot ws \cdot Lm$ $Vds = idr \cdot Lm \cdot p = (idr/dt) \cdot Lm$

So, Vds is a function of the current differential, and Vqs a function of the current assuming the speed is kept constant, which for a high inertial load such as a vehicle is reasonable. Since the rotor current and flux decay slowly, Vds is small compared to Vqs. Since idr decays during the pulsed torque control off period, Vqs decays as well. So the BEMF will never exceed the DC voltage when the inverter is turned off because the voltage just before the inverter is turned off is below the DC voltage and only decays after the inverter is switched off.

Figure 2A:
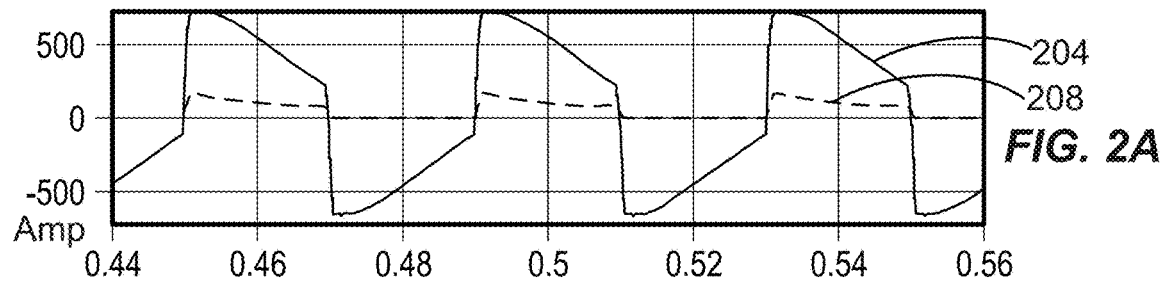
FIGS. 2A-E are graphs of current, flux, rotor flux demand, command torque, and inverter loss in a non-optimized pulsed process.
Figure 2B:
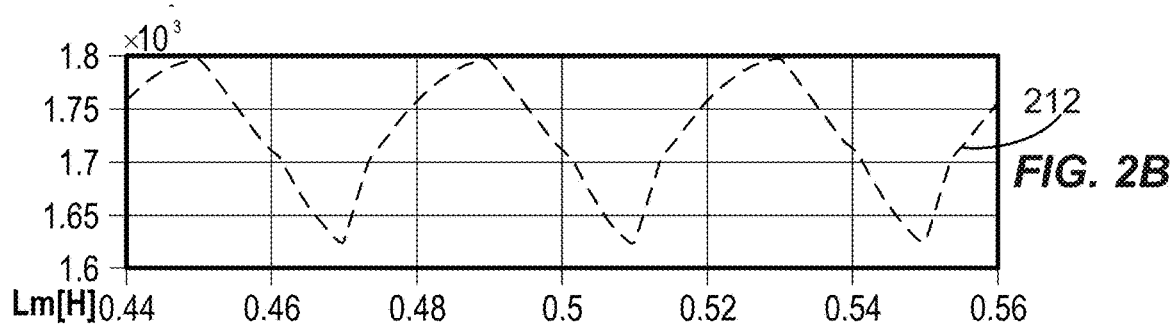
Figure 2C:
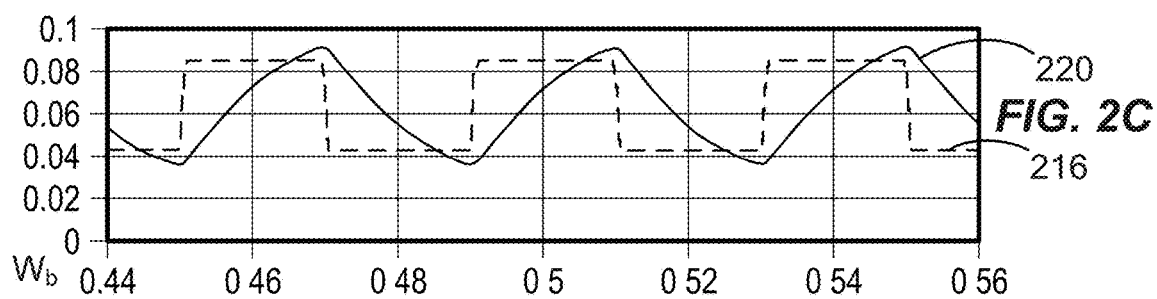
Figure 2D:
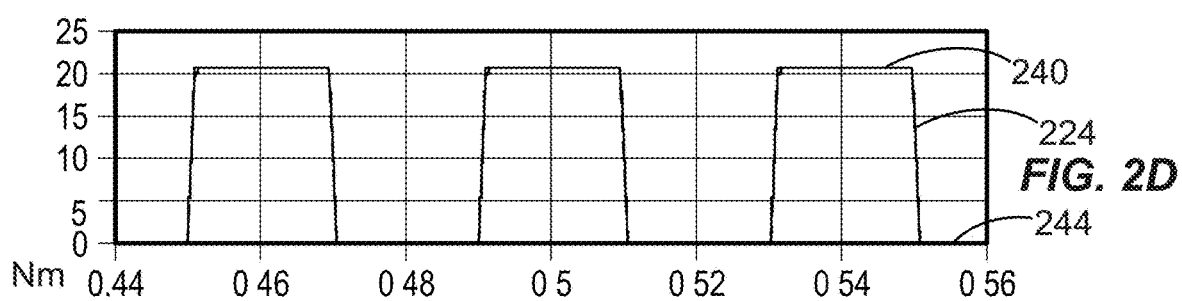
Figure 2E:
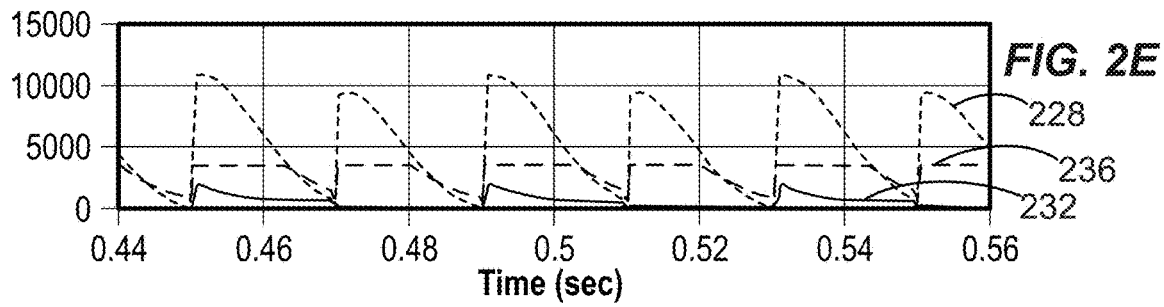

Now let us consider pulsed torque control operation of 10 Nm at 7000 rpm with a torque amplitude of ~20 Nm and modulation frequency of 25 Hz. FIGS. 2A-E shows the results from this simplified model based on the measured data. FIG. 2A is a graph of $i_d$ 204 and $i_q$ 208 with respect to time. In this simplified model, the commanded, or desired, currents $i_{dq}^*$ and the actual currents $i_{dq}$ are identical (i.e. the current control is perfect). In practical systems and current controllers, there will be some deviation between the commanded $i_{qd}$ currents and the measured currents. FIG. 2B is a graph of flux $L_m$ 212 with respect to time. FIG. 2C is a graph of rotor flux demand 216 and rotor flux actual 220 with respect to time. FIG. 2D is a graph of the torque command 224 with respect to time. FIG. 2E is a graph of inverter loss 228, core loss 232, and copper loss 236 with respect to time. The torque command 224, shown in FIG. 2D, provides a torque signal to provide a plurality of pulsed torques that pulse between a first demand torque level 240 and a second demand torque level 244. In FIG. 2D the first demand torque level 240 is between 20 and 25 Newton meters (Nm) and the second demand torque level is 0 Nm. Although the slew rates for maximum theoretical efficiencies are the highest slew rates possible, the slew rates in practice are limited by physical time constants, practical control bandwidth, and application (noise+vibration) limits. The maximum torque slew rate target for this application is 20 Nm/ms.

In order to maximize the rate of change of torque within the current limit of the motor, 520 RMS Amps, the maximum current is used. A large negative $i_d$ is being applied to extract the rotor current to meet the flux demand on the falling edge of the torque pulse and during the pulsed torque control "off" period. Large positive $i_d$ is then used to reestablish the rotor field at the rising edge of the torque pulse. To meet the torque while the flux is below the target, $i_q$ must be increased. This strategy will be referred to as Strategy 1. The use of high $i_d$ currents greatly increases the copper and inverter losses during pulsed torque control compared to an optimized solution, specifically during the "off" period and during the rising edge of the torque pulse. Additionally, since the stator current is never zero, the inverter cannot be switched off. Table 1, shown in FIG. 6, summarizes the losses, showing that this implementation of pulsed torque control significantly increases losses relative to continuous operation. Table 1 shows that the loss using a pulsed torque control implementation is 402% higher than the loss using a continuous implementation. As shown in FIG. 2A and Table 1, the current $i_d$ 204 is commanded to vary between a maximum current of $I_s$Max and a minimum current of $-I_s$Max. As a result, the example in Table 1, shown in FIG. 6, shows that pulsed torque control cannot generally be successfully applied to an IM at the modulation frequencies needed for automotive applications (20-40 Hz) without a specialized control strategy.

Figure 3A:
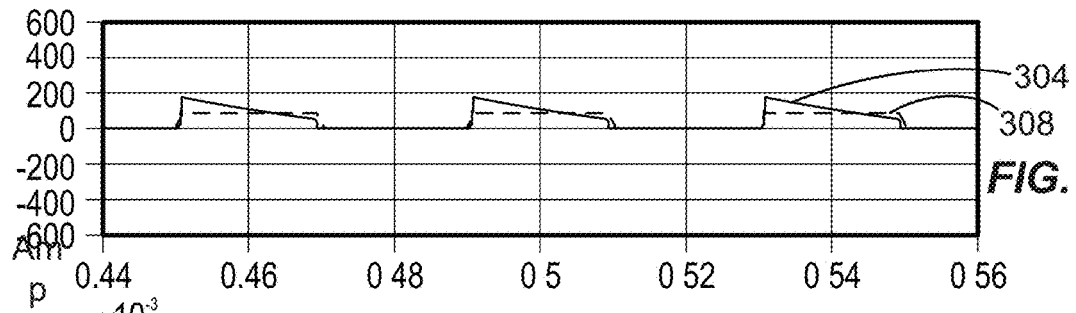
FIGS. 3A-E are graphs of current, flux, rotor flux demand, command torque, and inverter loss in an optimized pulsed process.
Figure 3B:
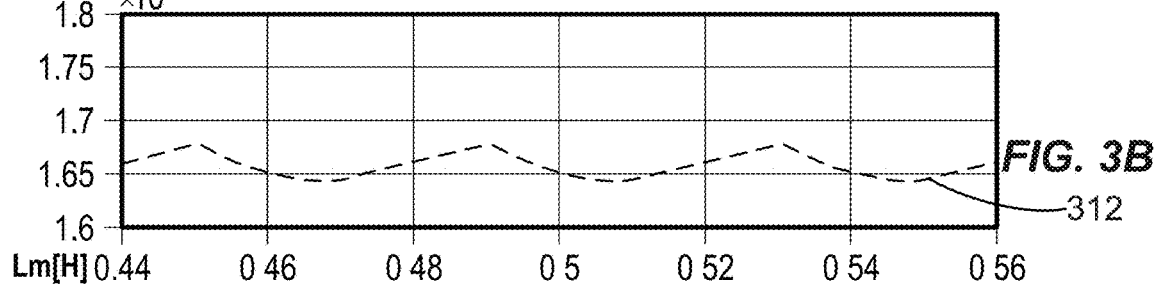
Figure 3C:
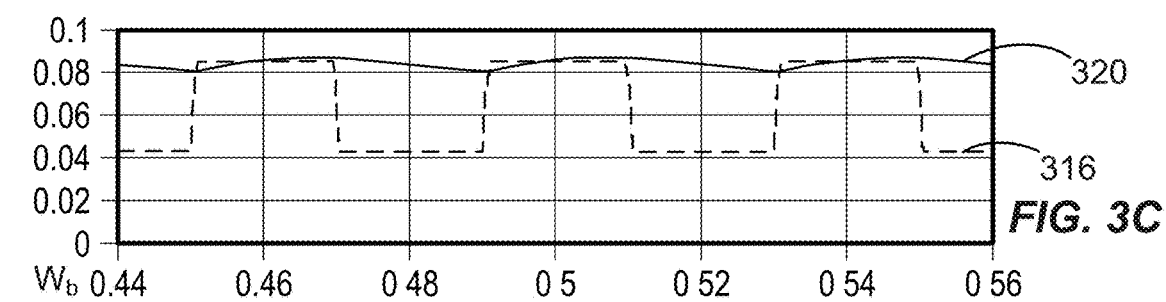
Figure 3D:
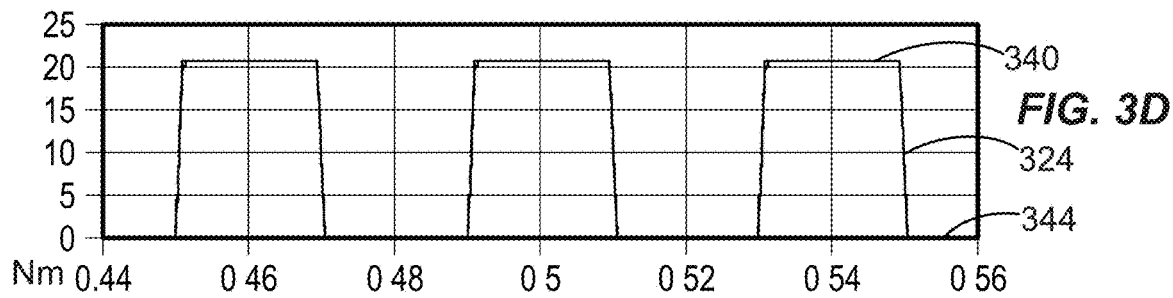
Figure 3E:
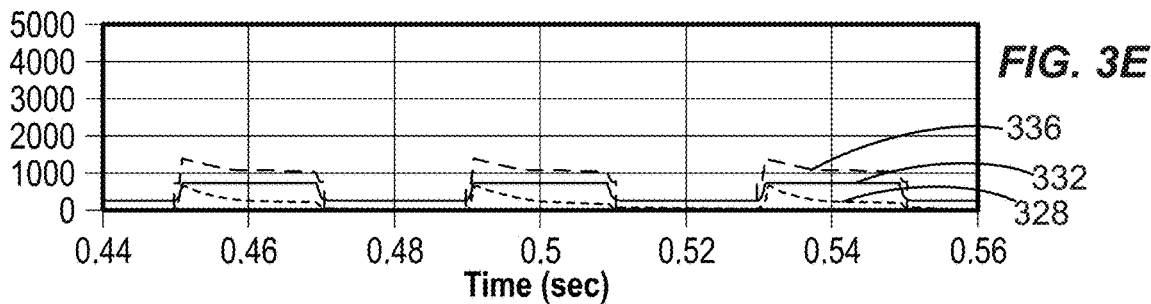

A primary part of this invention is to modify the control strategy for pulsed torque control by setting the negative $i_d$ current command limit to zero so that the flux is not reduced by the $i_d$ controller but allowed to naturally decay between pulsed torque control pulses. Because the time between pulses at automotive-relevant modulation frequencies (20-40 Hz) is short relative to the rotor time constant, the rotor flux does not decay appreciably between pulses. An example of this strategy, referred to as Strategy 2, is shown in FIGS. 3A-E. FIG. 3A is a graph of $i_d$ 304 and $i_q$ 308 with respect to time. FIG. 3B is a graph of flux $L_m$ 312 with respect to time. FIG. 3C is a graph of rotor flux demand 316 and rotor flux actual 320 with respect to time. FIG. 3D is a graph of the torque command 324 with respect to time. FIG. 3E is a graph of inverter loss 328, core loss 332, and copper loss 336 with respect to time. The torque command 324, FIG. 3D, provides a torque signal to provide a plurality of pulsed torques that pulse between a first demand torque level 340 and a second demand torque level 344. In some embodiments, when the torque command is at the second demand torque level 344, the power inverter is turned off. The losses associated with extracting and rebuilding the field flux are not incurred in the same way as Strategy 1. Only the rotor flux that naturally decays needs to be re-established for the next pulse. There is an initially higher pulse in $i_d$ to build up the flux and a small initial increase in $i_q$ to meet the torque demand. As shown in FIG. 3A and Table 1, the current $i_d$ 204 is commanded to vary between a maximum current of $I_s$Max and a minimum current of 0 amps. The copper and inverter losses are greatly reduced, as shown in Table 1, such that a reduction in total losses is achieved compared to continuous operation. Table 1 shows that the loss using an optimized pulsed torque control implementation according to Strategy 2 is 5% less than the loss using a continuous implementation. One drawback is that the retained rotor flux results in core losses during the pulsed torque control "off" period which increases core losses relative to Strategy 1, but this is more than compensated for the improvements in copper and inverter losses.

Figure 4A:
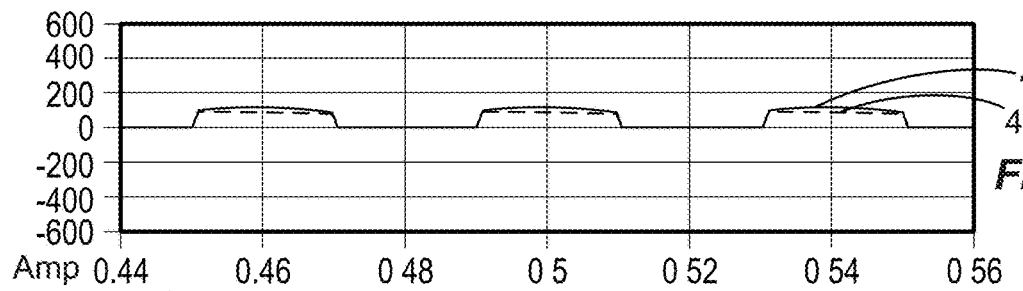
FIGS. 4A-E are graphs of current, flux, rotor flux demand, command torque, and inverter loss in a further optimized pulsed process.
Figure 4B:
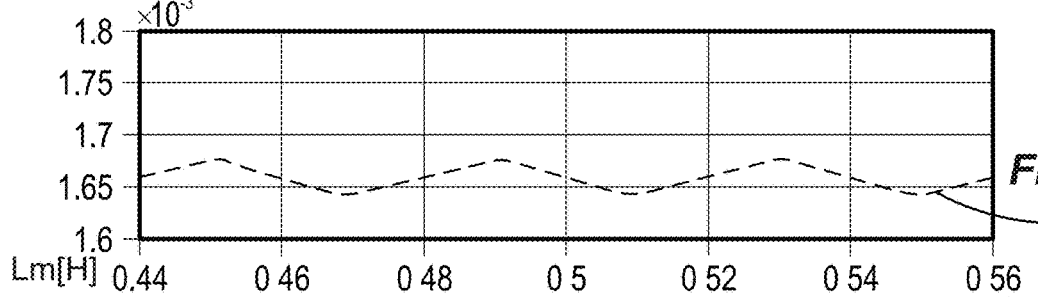
Figure 4C:
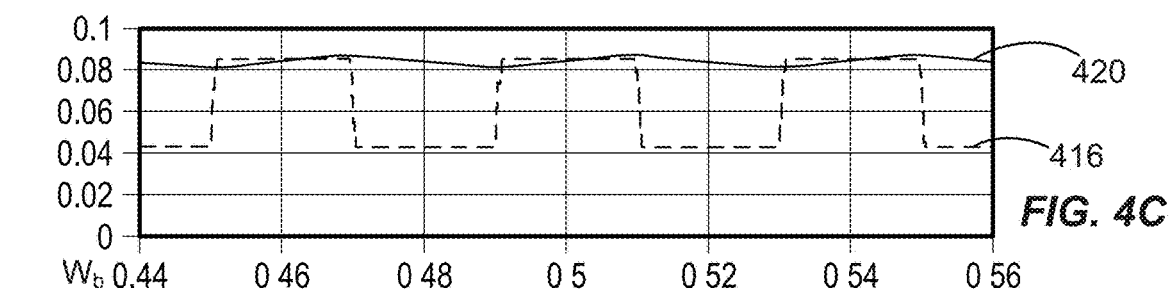
Figure 4D:
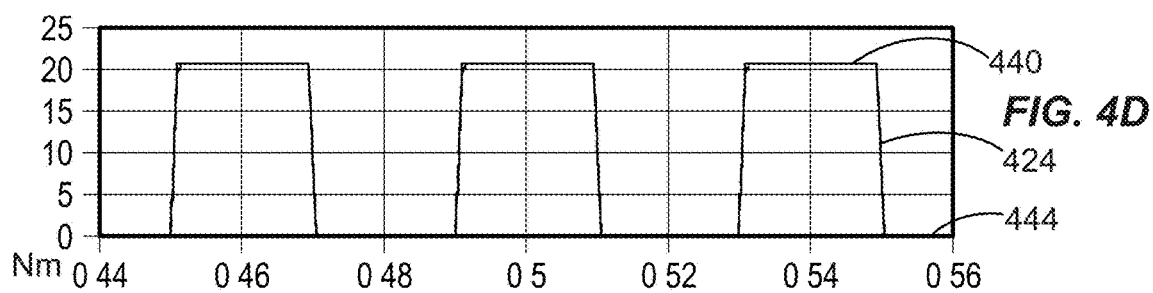
Figure 4E:
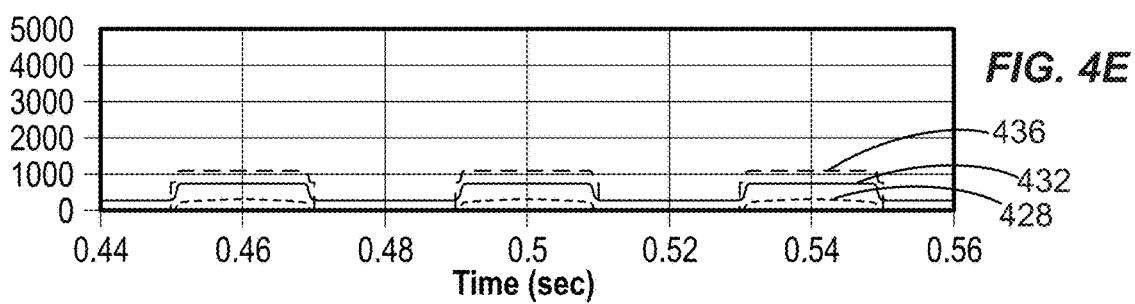

Further improvements can be made to the controller to mitigate the initial $i_d$ spike, resulting in a further reduction in total losses in pulsed torque control. These improvements are: (1) introduce a limit on the maximum positive commanded $i_d$, and (2) tune the flux controller gains to reduce the aggressiveness of the $i_d$ control. Those two changes are implemented in FIGS. 4A-E and referred to as Strategy 3. FIG. 4A is a graph of $i_d$ 404 and $i_q$ 408 with respect to time. FIG. 4B is a graph of flux $L_m$ 412 with respect to time. FIG. 4C is a graph of rotor flux demand 416 and rotor flux actual 420 with respect to time. FIG. 4D is a graph of the torque command 424 with respect to time. FIG. 4E is a graph of inverter loss 428, core loss 432, and copper loss 436 with respect to time. As shown in FIG. 4A and Table 1, the current $i_d$ 204 is commanded to vary between a maximum current of $I_d$Max and a minimum current of 0 amps. It should be noted that $I_d$Max under Strategy 3 is less than $I_s$Max under Strategy 2. Table 1 shows that the loss using a further optimized pulsed torque control implementation is 7% less than the loss using a continuous implementation. The initial spike in copper and inverter losses is reduced, although the flux takes slightly longer to reach the target. To meet the torque demand with the reduced flux, $i_q$ needs to be increased slightly at the start of the pulse. The extra losses associated with the $i_q$ increase are compensated by reductions from the $i_d$ decrease. Table 1 shows that the losses in pulsed torque control can be further reduced with Strategy 3.

In some embodiments, it has been found that the optimized $i_d$ under Strategy 3 with a reduced initial spike in copper losses provides a strictly increasing flux 412, shown in FIG. 4B, when the torque command 424 is at the first demand torque level 440 and the flux 412 is strictly decreasing when the torque command 424, shown in FIG. 4B, is at the second demand torque level 444. The definition of strictly increasing means as one value increases along a domain the related value in the range increases. The range cannot remain constant or decrease as the value in the domain increases. Strictly decreasing is the opposite of strictly increasing. This is in contrast to the flux 312, shown in FIG. 3B of Strategy 2, where the flux initially increases more steeply at the beginning of the torque command 324 being at the first demand torque level 340, and where the flux is constant near the end of the torque command 324 being at the first demand torque level 340. Since the flux 312 is constant for a time, the flux 312 is not strictly increasing. Since the flux initially increases more steeply in Strategy 2 than in Strategy 3, $i_d$ in Strategy 2 has larger copper losses than $i_d$ in Strategy 3, making Strategy 3 more energy efficient. As shown in FIG. 4C., in Strategy 3, the average rotor flux actual 420 is about equal to the rotor flux needed to provide the first demand torque level.

In some embodiments, the torque command 424 is selected so that an overall average system output provided by the torque command has a higher energy conversion efficiency during the pulsed demand torque operation of the polyphase machine than the polyphase machine would have when operated in a continuous (non-pulsed) manner to deliver the same average output. In addition, the pulsed command torque is chosen so that the pulsing may be used to reduce noise, vibration, and hardness.

Figure 5:
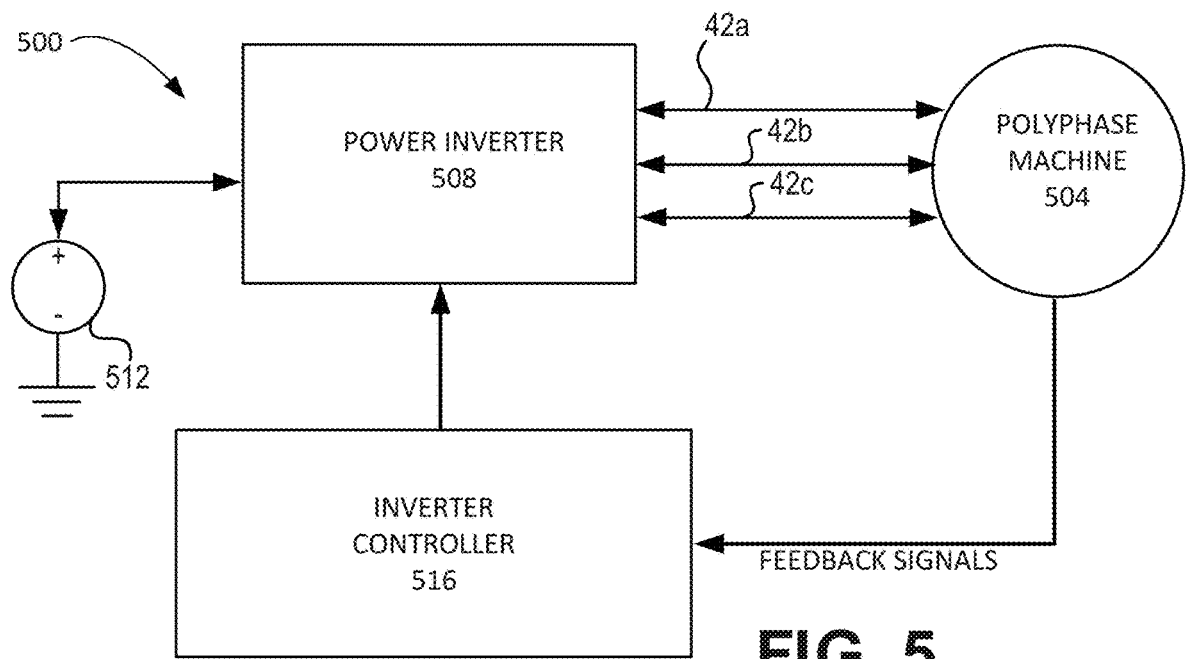
FIG. 5 is a block diagram of an electric machine system 500 that may be used in some embodiments.

Various embodiments may be used in various electric machines. To facilitate understanding, FIG. 5 is a block diagram of an electric machine system 500 that may be used in some embodiments. The electric machine system 500 comprises a polyphase electric machine 504, a power inverter 508, a power source 512, and an inverter controller 516. In the specification and claims, the polyphase electric machine 504 may be a polyphase motor or a polyphase generator. Therefore, in the specification and claims, the power inverter 508 is a power converter for either a polyphase motor or a polyphase generator. Such a power inverter 508 may also be called a power rectifier. In some embodiments, the power source 512 is a DC power source. One or more feedback signals are provided from the polyphase electric machine 504 to the inverter controller 516. In some embodiments, the polyphase machine 504 is a polyphase induction machine or a polyphase EESM.

In some embodiments, the inverter controller 516 may be located within the power inverter 508. In some embodiments, the inverter controller 516 may be outside of or separate from the power inverter 508. In some embodiments, part of the inverter controller 516 may be within the power inverter 508 and part of the inverter controller 516 may be outside of or separate from the power inverter 508. In some embodiments, the inverter controller 516 provides switching signals to the power inverter 508.

In some embodiments, where the polyphase electric machine 504 is operated as a 5-phase motor, the power inverter 508 is responsible for generating three-phase AC power from the DC power supply 512 to drive the polyphase electric machine 504. The three-phase input power, denoted as phase A 42a, phase B 42b, and phase C 42c, is applied to the windings of the stator of the polyphase electric machine 504 for generating a rotating magnetic field. The lines depicting the various phases, 42a, 42b, and 42c are depicted with arrows on both ends indicating that current can flow both from the power inverter 508 to the polyphase electric machine 504 when the machine is used as a three-phase motor and that current can flow from the polyphase electric machine 504 to the power inverter 508 when the polyphase electric machine 504 is used as a generator. When the polyphase electric machine 504 is operating as a generator, the power inverter 508 operates as a power rectifier, and the AC power coming from the polyphase electric machine 504 is converted to DC power being stored in the DC power supply 512.

Some embodiments may provide a method for determining the optimum calibrations for positive $i_d$ limit and controller gains for a system model (controller, motor plant, and loss models) within an optimizer loop at each speed and average torque operating point. A multi-parameter bounded gradient search method may be used to find the optimum combination. Other search algorithms could be used as well, such as brute force, genetic algorithm, etc. In some embodiments, the optimization minimizes $i_d$. In some embodiments, the optimized $i_d$ may provide a negative $i_d$.

While this disclosure has been described in terms of several preferred embodiments, there are alterations, modifications, permutations, and various substitute equivalents, that fall within the scope of this disclosure. It should also be noted that there are many alternative ways of implementing the methods and apparatuses of the present disclosure. It is therefore intended that the following appended claims be interpreted as including all such alterations, modifications, permutations, and various substitute equivalents as fall within the true spirit and scope of the present disclosure. As used herein, the phrase "A, B, or C" should be construed to mean a logical ("A OR B OR C"), using a non-exclusive logical "OR," and should not be construed to mean 'only one of A or B or C. Each step within a process may be an optional step and is not required. Different embodiments may have one or more steps removed or may provide steps in a different order. In addition, various embodiments may provide different steps simultaneously instead of sequentially. In addition, elements that are shown and described separately may also be combined in a single device or single step. For example, steps that are described sequentially may be simultaneous. In addition, steps described sequentially in one order may be performed in another order.

What is claimed is:

1. An electric machine, comprising:
   a polyphase machine comprising at least one of an induction machine and an externally excited synchronous machine;
   a power inverter electrically connected to the polyphase machine; and
   an inverter controller electrically connected to the power inverter, wherein the inverter controller is configured to:
   a) provide a torque command, wherein the torque command provides a torque signal to provide a plurality of pulses that pulse between a first demand torque level and a second demand torque level, wherein the second demand torque level is lower in amplitude than an amplitude of the first demand torque level; and
   b) control an $i_d$ provided by the power inverter, so that when the torque signal is at the first demand torque level, rotor flux strictly increases and when the torque signal is at the second demand torque level, rotor flux strictly decreases.

2. The electric machine, as recited in claim 1, wherein the second demand torque level is zero.

3. The electric machine, as recited in claim 2, wherein an average rotor flux is approximately equal to a first rotor flux, wherein the first rotor flux is a flux required to provide the first demand torque level.

4. The electric machine, as recited in claim 3, wherein during the second demand torque level the power inverter is turned off.

5. The electric machine, as recited in claim 1, wherein the inverter controller provides the torque signal to the power inverter.

6. The electric machine, as recited in claim 5, wherein the inverter controller provides a pulsed demand torque operation between the first demand torque level and the second demand torque level with a period of less than one second.

7. The electric machine, as recited in claim 6, wherein the torque command provides an overall average system output having a higher energy conversion efficiency during a pulsed demand torque operation of the polyphase machine than the polyphase machine would have when operated in a continuous manner to deliver a same average output.

8. The electric machine, as recited in claim 7, wherein the torque command provides reduced noise, vibration, and harshness.

9. The electric machine, as recited in claim 1, wherein $i_d$ has a minimum current command of 0, so that a $i_d$ is never negative during the torque command.

10. A method for pulsing a polyphase machine comprising at least one of an induction machine electrically and an externally excited synchronous machine connected to a power inverter and an inverter controller controllably connected to the power inverter, the method comprising:
   a) providing a torque command, wherein the torque command provides a torque signal to provide a plurality of pulses that pulse between a first demand torque level and a second demand torque level, wherein the second demand torque level is lower than the first demand torque level; and b) controlling an is provided by the power inverter, so that when the torque signal is at the first demand torque level, rotor flux strictly increases, and when the torque signal is at the second demand torque level, rotor flux strictly decreases.

* * * * *